(12) United States Patent
Robbins, III

(10) Patent No.: US 7,029,743 B2
(45) Date of Patent: *Apr. 18, 2006

(54) DESK CHAIR MAT

(76) Inventor: Edward S. Robbins, III, 2802 Avalon Ave., Muscle Shoals, AL (US) 35661

( * ) Notice: Subject to any disclaimer, the term of this patent is extended or adjusted under 35 U.S.C. 154(b) by 117 days.

This patent is subject to a terminal disclaimer.

(21) Appl. No.: 10/842,387

(22) Filed: May 10, 2004

(65) Prior Publication Data
US 2004/0226229 A1    Nov. 18, 2004

Related U.S. Application Data

(63) Continuation-in-part of application No. 10/439,691, filed on May 16, 2003, now Pat. No. 6,946,184.

(51) Int. Cl.
*B32B 3/26* (2006.01)
(52) U.S. Cl. .................................. 428/120; 428/156
(58) Field of Classification Search ............ 428/99, 428/120, 195.1, 156; 15/215; 52/177
See application file for complete search history.

(56) References Cited

U.S. PATENT DOCUMENTS

| | | | |
|---|---|---|---|
| 4,340,633 A | 7/1982 | Robbins, Jr. | |
| 4,448,625 A | 5/1984 | Carrera | |
| 4,472,471 A | 9/1984 | Klein et al. | |
| 4,590,120 A | 5/1986 | Klein | |
| 4,784,888 A | 11/1988 | Schwertner et al. | |
| 4,885,659 A | 12/1989 | Nowell et al. | |
| 5,048,182 A | 9/1991 | Robbins, III | |
| 5,073,428 A | 12/1991 | Lancelot et al. | |
| 5,170,526 A | 12/1992 | Murray | |
| 5,227,214 A | 7/1993 | Kerr et al. | |
| 5,807,021 A | 9/1998 | Aaron | |
| 6,177,165 B1 | 1/2001 | Robbins, III et al. | |
| 6,183,833 B1 | 2/2001 | Robbins, III et al. | |
| 6,284,341 B1 | 9/2001 | Robbins, III et al. | |
| 6,287,659 B1 | 9/2001 | Robbins, III et al. | |
| 6,308,842 B1 | 10/2001 | Robbins, III et al. | |
| 6,319,592 B1 | 10/2001 | Ney et al. | |
| D454,324 S | 3/2002 | Lu | |
| 6,554,782 B1 | 4/2003 | Robbins, III et al. | |
| 6,579,250 B1 | 6/2003 | Robbins, III et al. | |

*Primary Examiner*—Alexander S. Thomas
(74) *Attorney, Agent, or Firm*—Brinks Hofer Gilson Lione

(57) ABSTRACT

A desk chair mat has a substantially planar upper surface suitable for interaction with a chair support structure, a perimeter defining an outer edge of the mat, a lower surface parallel to the upper surface. An array of generally blunt projections extends downwardly from a first area of the lower surface for engagement with a carpet. An image is formed within a second area of the lower surface. Each blunt projection has a smooth end surface spaced below the lower surface by a distance sufficient to penetrate into the carpet pile. The array is generally a regular pattern of the projections that can be arranged at an angle with respect to each nearest neighbor to provide enhanced resistance to lateral movement of the mat with respect to the carpet to protect the image from abrasion.

17 Claims, 8 Drawing Sheets

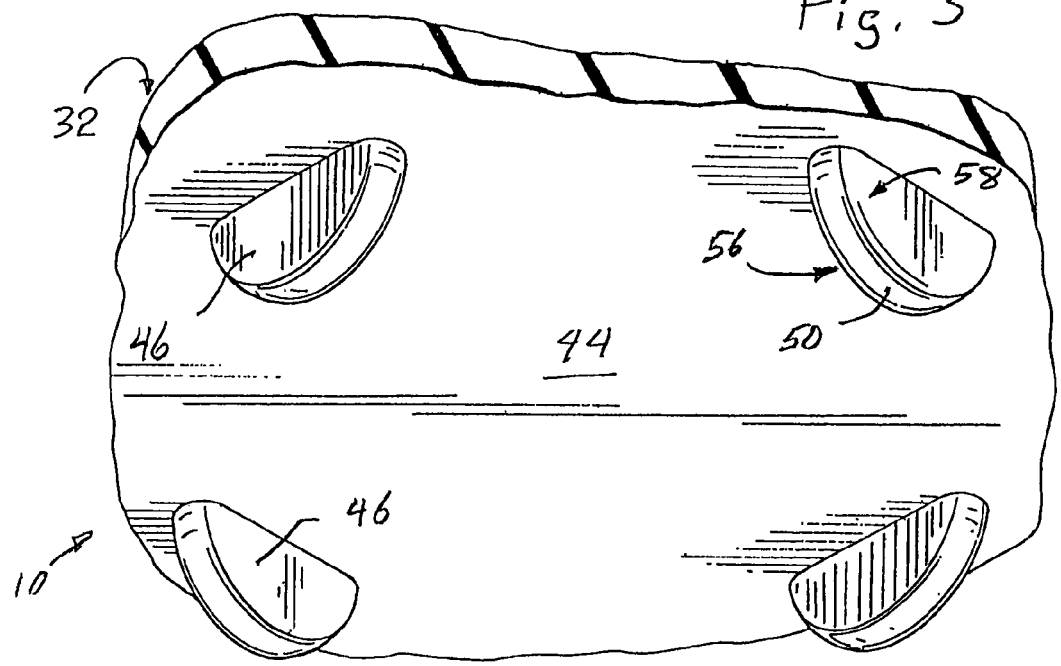
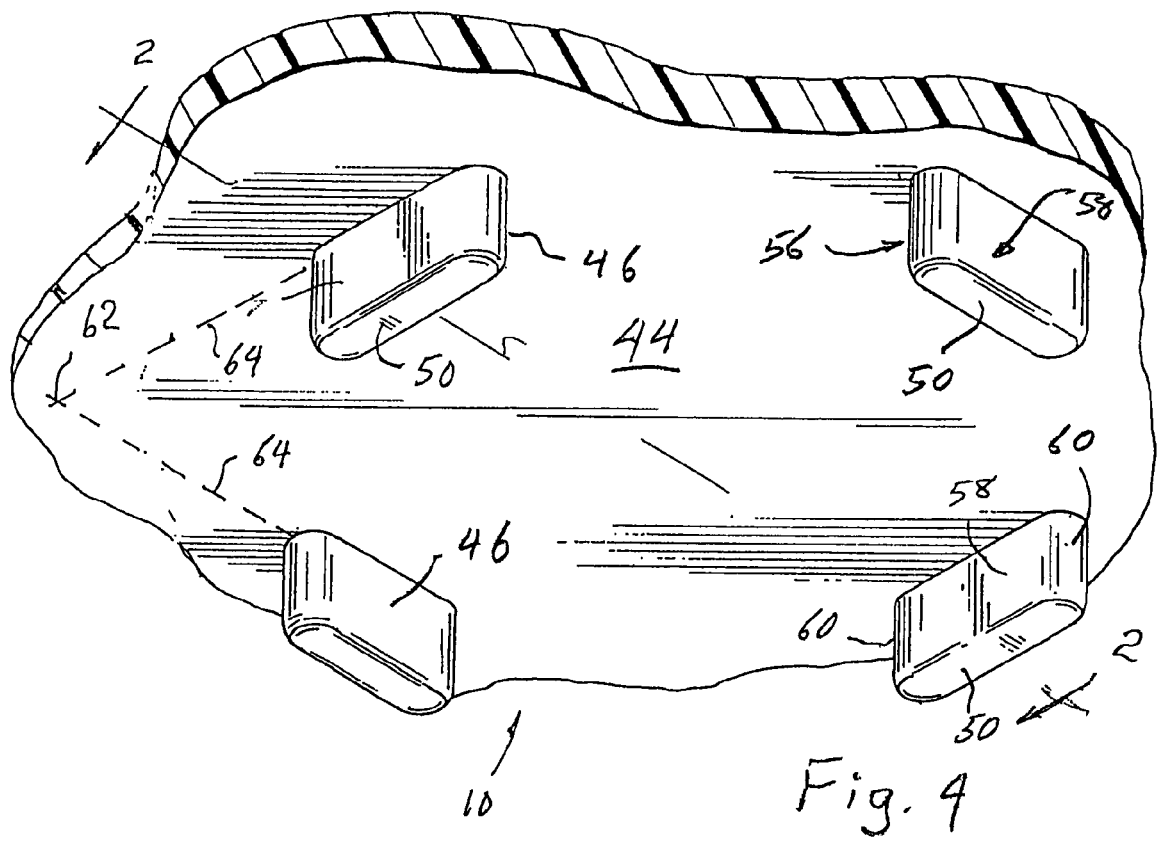

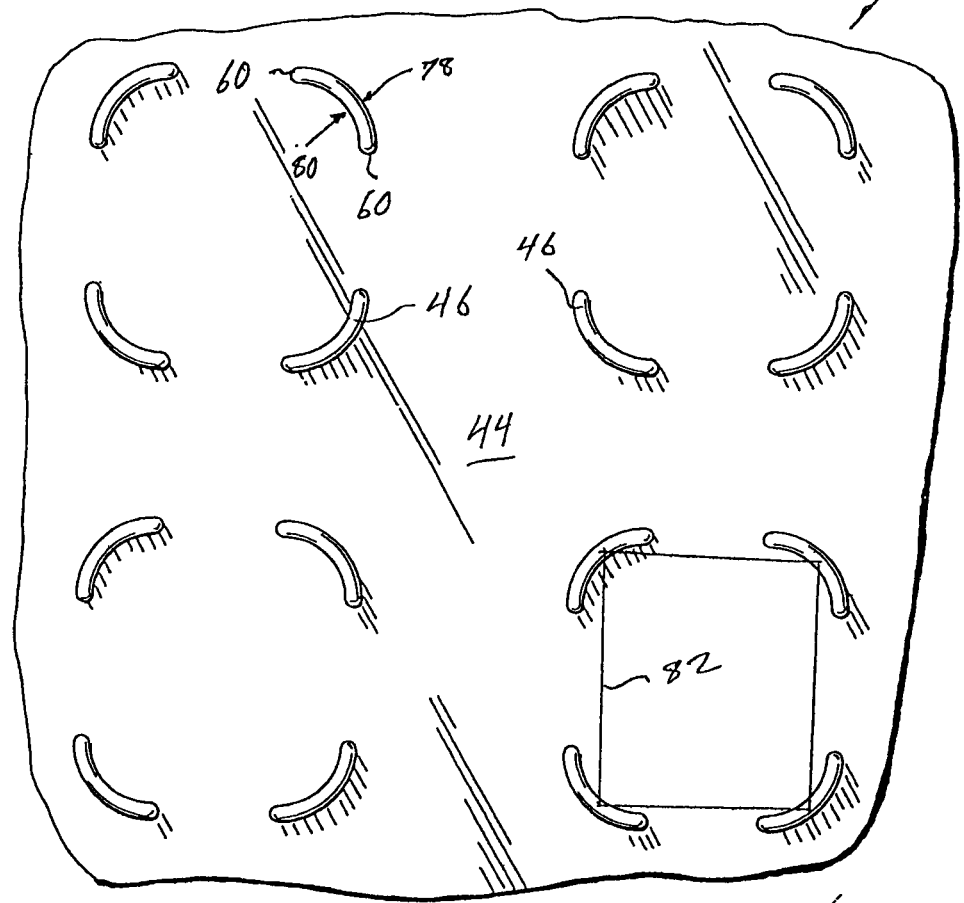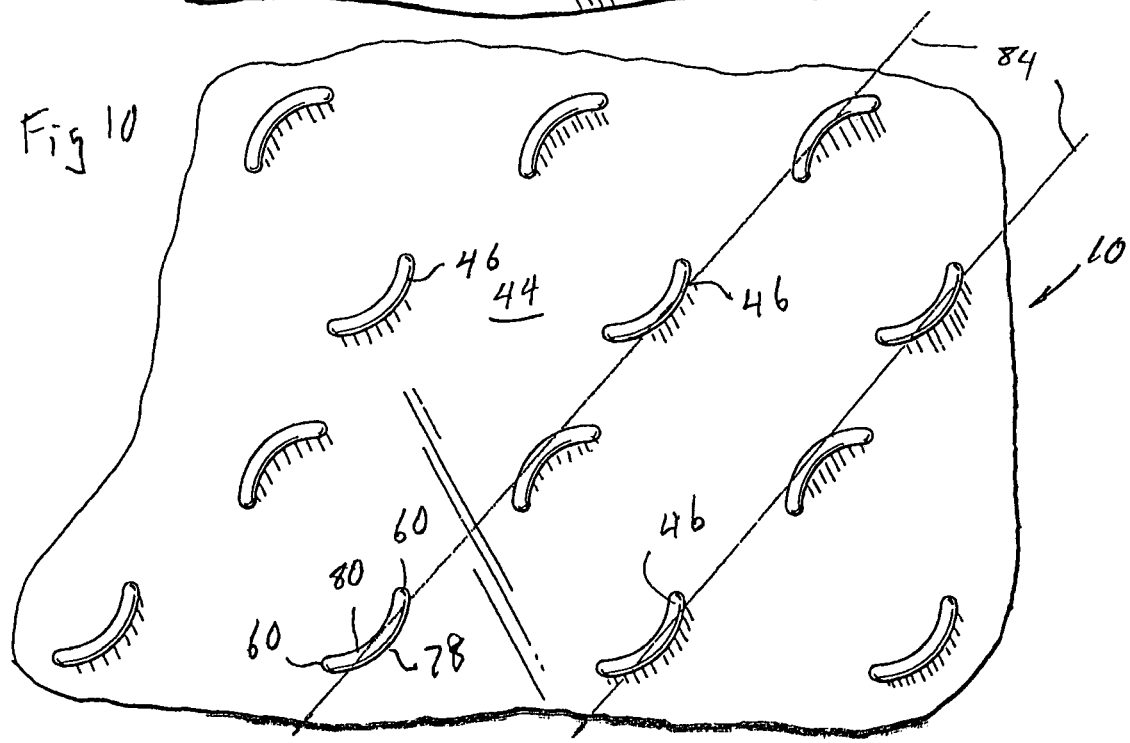

DESK CHAIR MAT

CROSS-REFERENCE TO RELATED APPLICATIONS

The present invention is a continuation-in-part of U.S. application Ser. No. 10/439,691 filed May 16, 2003, now U.S. Pat. No. 6,946,184.

BACKGROUND

The present invention is directed to chair mats and specifically, to chair mats typically used under desk chairs in order to protect an underlying carpet. In particular, the present invention relates to a chair mat having a decorative pattern and on which a chair, such as a desk chair, may be used without harming the decorative pattern.

Desk chair mats for office and home use are well known. Such a chair mat has a main portion on which the desk chair rolls, and can include a forward lip portion which is adapted to extend partially into a desk well, and on which the feet of the person sitting in the chair can rest. A desk chair mat that is to be applied over carpeting is typically formed of a semi-rigid plastic, and has an array of short, sharp spikes on an underside thereof, which hold the mat firmly in place on the carpeting. While desk chair mats can be made without any spikes, the mats tend to move relative to the carpet in response to movement of any desk chair on the top surface of the mat. Thus a carpet-engaging structure is deemed necessary to achieve satisfactory performance.

Such a desk chair mat is awkward to carry and/or otherwise handle due to its size, the semi-rigid nature of the material from which it is formed, and particularly with the spikes. Unless the chair mat is boxed or otherwise protected, the user typically carries the chair mat by gripping about one or two of the edges of the chair mat, often resulting in irritation if not injury to the hands, due to the spikes projecting from the underside of the chair mat.

Attempts have been made to solve these problems by making the chair mat foldable to thereby reduce its size for handling purposes. See, for example, U.S. Pat. Nos. 4,784,888; 5,073,428 6,183,833 and 6,284,341. Further, handles have been included as a portion of the chair mat to enable safe handling. See, for example, U.S. Pat. Nos. 6,177,165; 6,287,659 and 6,308,842. Generally, desk chair mats have been sold at office supply stores or distributors as opposed to retail stores, and to some extent, the handling problem was alleviated by boxing the chair mats individually or in groups prior to shipping. Chair mats are now being found increasingly in retail outlets, compounding the problem of safe handling. While chair mats can be boxed, the boxes add cost and are themselves unwieldy, and are therefore not necessarily desirable in the retail environment. Thus, with increasing retail activity, new display schemes are also required. The last mentioned patent includes the disclosure of a retail display system designed to facilitate safer handling of chair mats.

Even when supplied from a distributor in boxed form, the end user must remove the chair mat from the box and position it at its final destination, again, with some difficulty due to the physical attributes of the chair mat. Thus the opportunity for irritation if not injury to the hands, due to the spikes projecting from the underside of the chair mat continues even after purchase. Accordingly, there remains a need for a solution to the problem of transporting desk chair mats easily and safely from the point of manufacture through the point of stocking and display in a retail environment to the point of ultimate use.

Once situated for use, a typical chair mat tends to be positioned over carpeting. Such chair mats are typically made of a transparent or translucent plastic material. Thus, the underlying carpet on which the chair mat is placed is visible through the chair mat as are the structural details of the pattern of spikes that project down to engage the carpet. The chair mat generally does not make any separate esthetic contribution. Some attempts have been made to arrive at chair mats that contribute esthetically as well as provide protection for the underlying carpet, for example, the mat disclosed in U.S. Pat. No. 6,319,592 to Ney et al. The Ney mat consisted of a separately prepared graphics layer sandwiched between a rigid base layer and a rigid upper protective layer. Both the base layer and upper protective layer were bonded to the graphics layer with the aid of adhesives. The nature of the graphics layer or the underlying adhesives layer is such as to render the base layer invisible. The area of the carpeting under such a chair mat would also be rendered invisible. This has the effect of making the chair mat itself stand out from the remaining portion of the carpeting, which may not be desirable in many situations. Accordingly, there remains a need for a desk chair to which graphics can be applied that are not subject to surface wear and remain visible along with the underlying carpet.

BRIEF SUMMARY

A desk chair mat of the present invention is intended for interposition between a carpet upper surface and a chair, and can have a substantially planar upper surface suitable for interaction with a chair support structure that typically includes a plurality of wheels on the lower outside points of a spider. The desk chair mat has a perimeter defining an outer edge of the mat, and a lower surface parallel to the upper surface. The lower surface can include an array of blunt projections extending downwardly from the lower surface for engagement with the carpet. Each of the projections can have a smooth end surface spaced below the lower surface of the desk chair mat by a distance sufficient to penetrate into the carpet upper surface, typically by about 3 mm or more. The array of projections can be confined to a first selected area of the lower surface, while a second selected area of the lower surface can include a graphic that is visible through the upper surface of the chair mat. The array of projections in the first area resists lateral forces acting on the desk chair mat and thereby stabilizes the mat with respect to the carpet sufficiently to prevent any significant wear of the graphic in the second area.

The array of blunt projections can assume any number of appearances. The blunt projections can be linear, angular or curved. Usually, the vertical cross-sectional aspect ratio of the blunt projections is greater that one in a first direction and less than one in a direction normal to the first direction. The smooth end surfaces of the blunt projections can be generally parallel to the lower surface of the desk chair mat or arcuate. The smooth end surface of each of the blunt projections has an area sufficient to prevent penetration of the skin of someone handling the mat, which is believed to be at least about 8 $mm^2$. The end surface of each of the blunt projections is sufficiently smooth to prevent abrasion of the skin of someone handling the mat.

The blunt projections can be aligned in spaced linear arrays. The resistance to lateral forces can be enhanced by arranging the blunt projections in a regular pattern wherein each projection is situated at an angle with respect to each nearest neighbor. The resistance to lateral forces can also be achieved by arranging the blunt projections in rows with the projections in adjacent rows being situated at an angle to each other. The blunt projections can cover a majority of the lower surface of the desk chair mat, but need not extend to any given area including the perimeter. The distance between the blunt projections can vary considerably, but is typically between about 1 and 4 cm. The first area containing the array of projections can be larger than the second area containing the graphic. The second area can be centrally located with the first area completely surrounding the second area. Alternatively, the second area can be confined to include a portion of the periphery.

A desk chair mat of the present invention can be made from a suitable semi-rigid plastic such as acrylic, polycarbonate, polypropylene, or polyvinylchloride having a Rockwell hardness of between about 80 and 95, and can include static-reducing elements. A desk chair mat of the present invention can include handles and tab structures that will facilitate the handling and display of the mat. A desk chair mat of the present invention can also include a fold line or cut that will enhance ease of handling. The graphic within the second portion of the lower surface of the chair mat can be formed during the extrusion-fabrication process by including an embossed or etched graphics pattern on a pattern roll that is brought into intimate contact with the lower surface of the mat. The graphic can also be applied by contacting the second area of the chair mat lower surface with a silk screen mat, a print transfer roll, a label, a decal, or other indicia bearing sheet or transfer roll. The first surface can remain un-affected by the application of the graphic so that the chair mat is generally transparent except where the subject matter of the graphic sufficiently inhibits the view of the underlying carpet.

One advantage of a desk chair mat of the present invention is a reduction in damage to the underlying carpet since the characteristic feature of the smooth end structure of the blunt projections that inhibits irritation and injury to the hands also protects the carpet. Another advantage of a desk chair mat of the present invention is a chair mat that can be produced at comparatively low cost yet can contain attractive graphics presentations that are protected from wear. Other features and advantages of a desk chair mat of the present invention will become apparent to those skilled in the art from a consideration of the following discussion that makes reference to the accompanying drawings.

BRIEF DESCRIPTION OF THE DRAWINGS

FIG. 3 is a detail perspective view of a portion of the lower surface of a desk chair mat showing several blunt projections of the present invention.

FIG. 4 is a detail perspective view of a portion of the lower surface of another desk chair mat showing several blunt projections of the present invention.

FIG. 9 is another bottom plan view of a portion of another desk chair mat of the present invention.

FIG. 10 is another bottom plan view of a portion of another desk chair mat of the present invention.

DETAILED DESCRIPTION OF PREFERRED EMBODIMENTS

Figure 1:
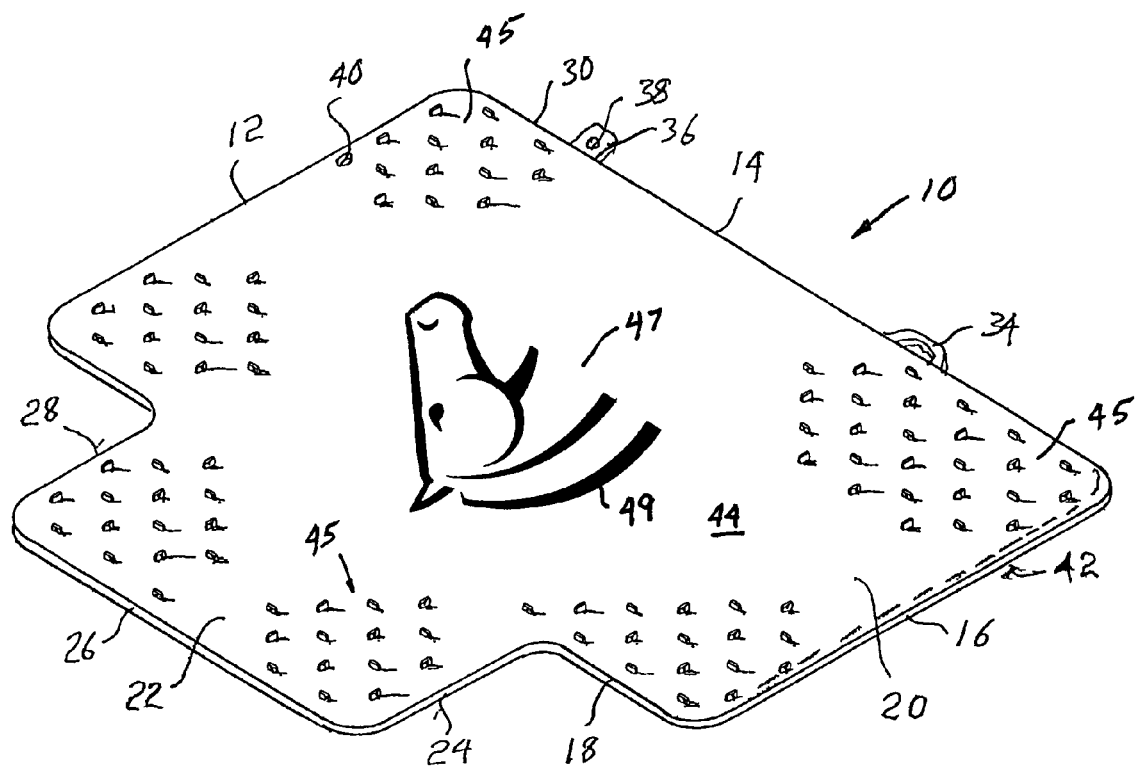
FIG. 1 is a perspective view of the lower surface of a desk chair mat of the present invention.

FIG. 1 shows a desk chair mat 10 formed of a planar, semi-rigid member (made from, e.g., PVC, polypropylene, semi-rigid vinyl or other suitable material) having four side edges 12, 14, 16 and 18, which define a major portion 20 of the chair mat 10. An optional extension portion 22 of the same material and thickness, projects or extends integrally from side edge 18, and is further defined by edges 24, 26, 28 completing the periphery 30 of the mat 10. The extension 22, as is well known, is designed to project into the well area of a desk (not shown), with the remainder of the chair mat 10 behind the desk and serving as the principal contact area for a desk chair (not shown) typically (but not necessarily) fitted with rollers or casters. The chair mat 10 for purposes of this invention, however, need not have an extension 22 of this type. The chair mat 10 can include one or more handles 34, which can project from any point on the periphery 30 of the mat 10. The chair mat 10 can also include one or more hang tabs 36 along one or more side edges of the chair mat 10, the hang tabs 36 being formed with holes or apertures 38 which enable the mat 10 to be suspended from display hooks or similar structures. Alternatively or additionally, one or more small holes 40 can be formed within the periphery 30 of the mat 10 to facilitate hanging.

Figure 2:
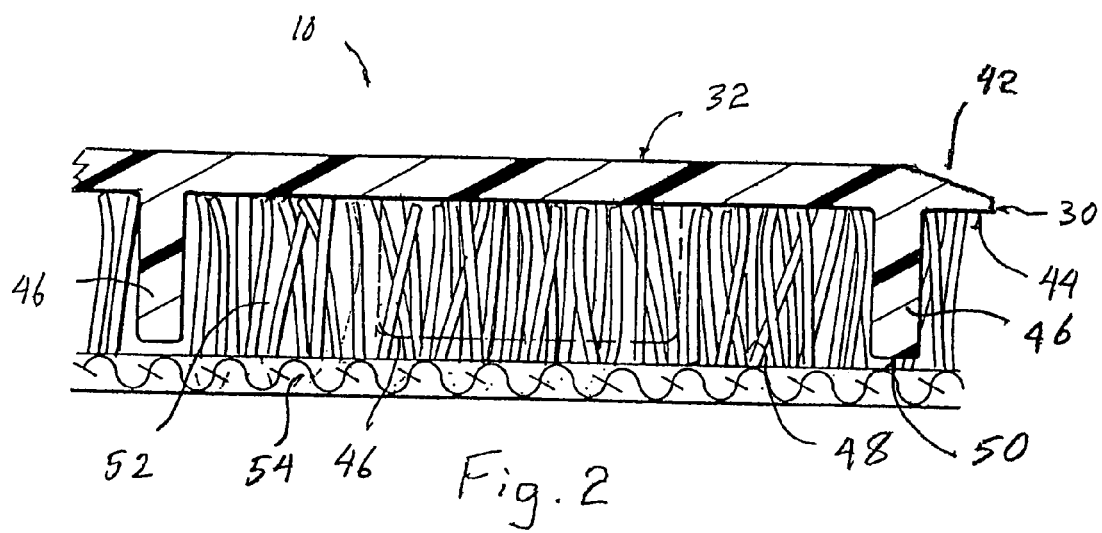
FIG. 2 is a sectional view of a desk chair mat of the present invention placed on a conventional carpet.

An upper surface 32 of the chair mat 10 is generally smooth, as shown in FIG. 2, so as to interact with the supporting structure of the desk chair. The phrase "generally smooth" in reference to the upper surface 32 is to be understood to include both smooth mirror-like surfaces and textured surfaces that resist scratches but remain sufficiently planar as to not significantly distort or hide the appearance of the lower surface of the chair mat 10 as viewed through the upper surface 32. The upper surface 32 of the chair mat 10 can also be formed with a tapered marginal edge 42 that extends about the entire periphery 30 of the chair mat 10 as shown in FIG. 1. The chair mat 10 also has a lower surface 44 that includes at least one first area 45 including an array of projections 46 extending downwardly from the lower surface 44 for engagement with an underlying carpet 48. The lower surface 44 of the chair mat 10 can also have at least one second area 47 that includes a graphic image 49 that is visible through the upper surface 32. The graphic image 49 can be positioned in the central portion of the chair mat 10 or at other positions closer to the periphery 30. The area 47 that includes the graphic image 49 is generally devoid of the projections 46. The area 45 containing the projections 46 should be of sufficient size to ensure that the graphic image 49 will be adequately protected from abrasion by any underlying carpet. The graphic image 49 can be formed by a variety of techniques including silk-screening or otherwise printing an image directly onto the second area 47 of the lower surface 44. The graphic image 49 can also be formed by applying a label or decal to the second area 47 of the lower surface 44. The graphic image 49 can also be formed by molding the image into the second area 47 of the lower surface 44. The molding of the image into the second area 47 can be accomplished during an extrusion process detailed below.

The blunt projections 46 can include a smooth end surface 50 spaced below the lower surface 44 by about 3 to 10 mm. In cross-section, as seen in FIG. 2, the blunt projections 46 can have a height to width aspect ratio between about 2 and 4 that enables the end surfaces 50 of the blunt projections 46 to nestle into the pile 52 of the carpet, generally without contacting the carpet backing 54. A light phantom outline 52 is shown of a side view of another of the blunt projections 46 partially hidden by the pile 52 of the carpet 48.

Some typical blunt projections 46 on lower surfaces 42 of a chair mat 10 of the present invention are shown in greater detail in FIGS. 2 and 3. It will be noted initially that FIG. 4 includes a section line 2-2 that indicates the direction of the cross-section shown in FIG. 2. It will be further noted that the projections 46 typically comprise a pair of generally parallel sidewalls 56 and 58 that project essentially normally from the lower surface 44 of the mat 10. The end surface 50 of the blunt projections 46 extend from one sidewall 56 to the other sidewall 58. The end surface 50 can be arcuate as shown in FIG. 3 or more flattened as shown in FIG. 4. When the end surface 50 is flattened as shown in FIG. 4, the blunt projections also include tip surfaces 60 which are shown to be rounded but can also be flattened. It is desirable that the ends 50 are not pointed or sharp so that injury to both the installer and the carpeting is avoided. To achieve the desired bluntness, the area of the end surface 50 is generally at least about 8 mm$^2$.

The blunt projections 46 can be arranged in a variety of patterns. Further the blunt projections 46 can individually take a variety of shapes. Both FIGS. 3 and 4 show the blunt projections 46 arranged in a rectangular array, which can be, for example, linear or square. The term "square" when used in characterization of an array or projections is intended to include circumstances wherein each projection 46 forms merely a small elemental portion of the rectangle and the corners 62 of the rectangle are defined by some imaginary points located at the intersection of lines 64 projecting length wise from the tip surfaces 60.

Figure 5:
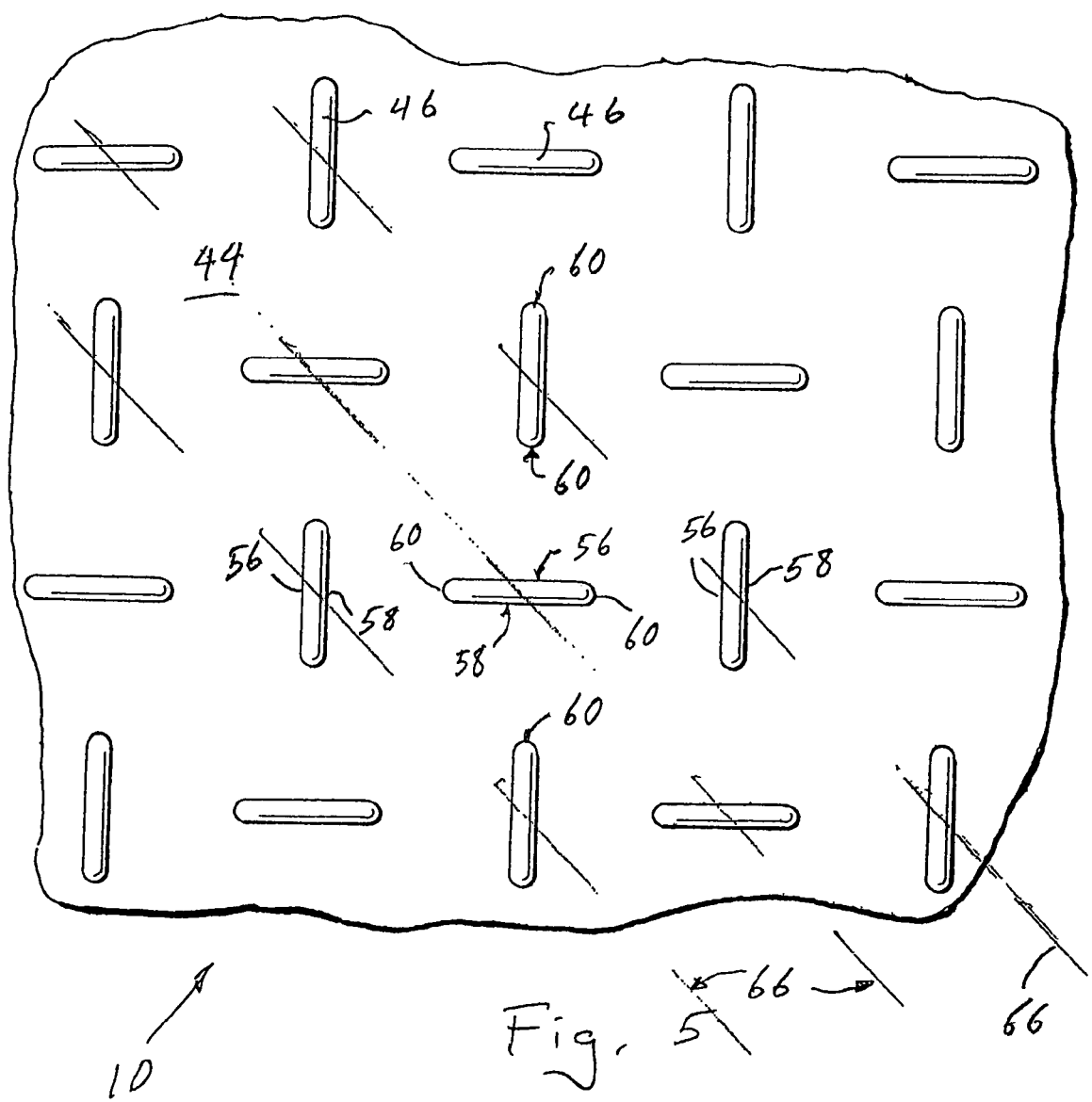
FIG. 5 is a bottom plan view of a portion of a desk chair mat of the present invention.

A variation on this rectangular array is shown in FIG. 5 in which parallel rows 66 of linear blunt projections 46 are arranged so that the tips 60 of the individual blunt projections 46 are perpendicular to the sides 56 and 58 of adjacent blunt projections 46, which results in a staggered rectangular array. The projections 46 of the array shown in FIG. 5 are somewhat closer to each other than are the projections of the arrays shown in either FIG. 3 or 4. As a rule, the distance between nearest neighbor projections 46 is generally between about 1 and 4 cm. If the spacing is dramatically smaller that this, the mat 10 can tend to ride on top of the carpet 48 rather than nestle into the pile 52 as preferred. If the spacing is dramatically larger that this, and the size of the individual projections remains substantially unchanged, the side surfaces 56 and 58 may not provide sufficient stability of the mat 10 relative to the carpet 48 to prevent creep, which can lead to possible damage of the image 49.

Figure 12:
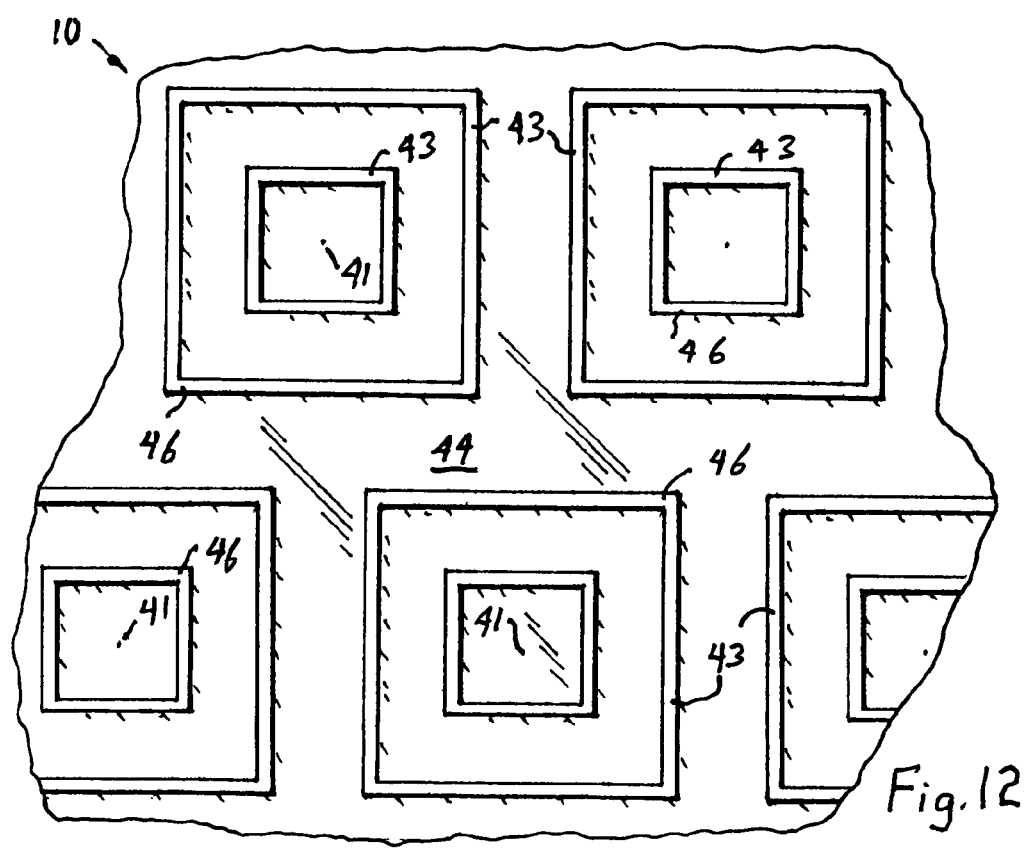
FIG. 12 is another bottom plan view of a portion of another desk chair mat of the present invention.

A further variation on this rectangular array is shown in FIG. 12 wherein some of the projections 46 are sufficiently length-wise continuous along the lower surface 44 to individually define a closed loop 43 such as a rectangle, square, circle, parallelogram, trapezoid, or other irregular figure. The shape of the closed loop can be selected, for example, to coordinate with an underlying carpet pattern. The closed loops 43 can be arranged concentrically about central points 41, which in turn can be arranged in arrays of various designs. The closed loops 43 have the added advantage of contributing significantly to the structural rigidity of the chair mat 10 in which they are incorporated. This added structural rigidity can be used to reduce the thickness of the mat 10 thus lowering its material cost, while retaining the desired performance. This added structural rigidity can also be limited for use in critical areas of the mat that typically bear larger deformation forces or for special "heavy weight" models.

Figure 6:
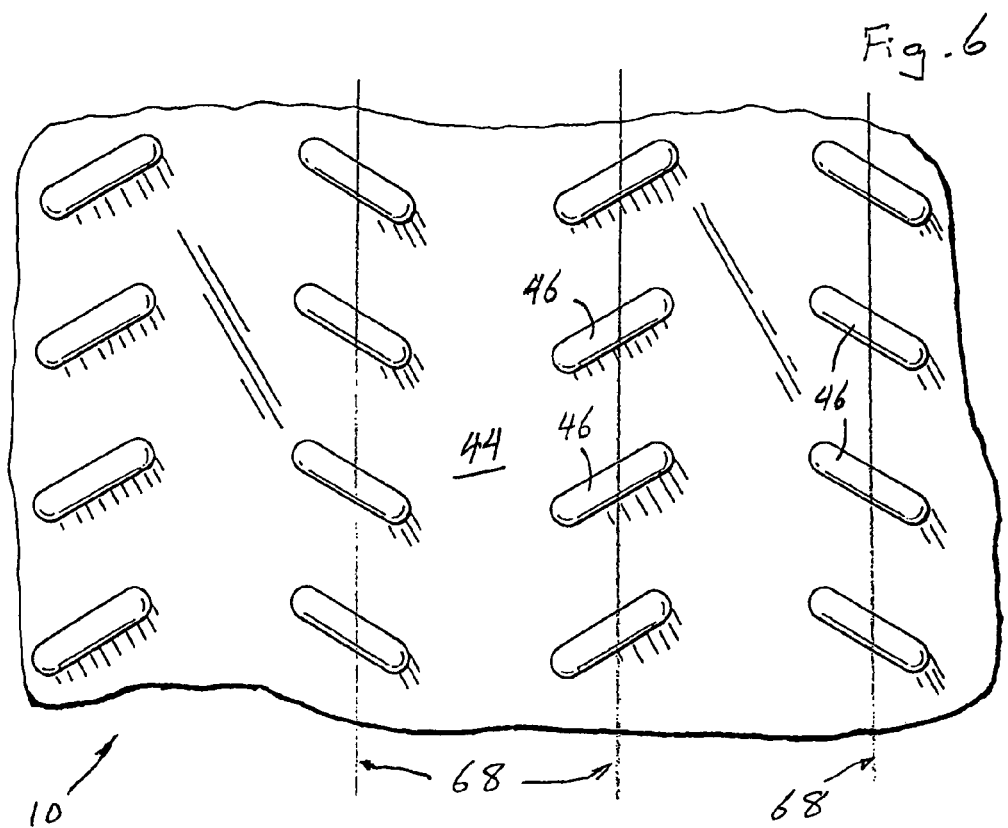
FIG. 6 is a bottom plan view of a portion of another desk chair mat of the present invention.
Figure 7:
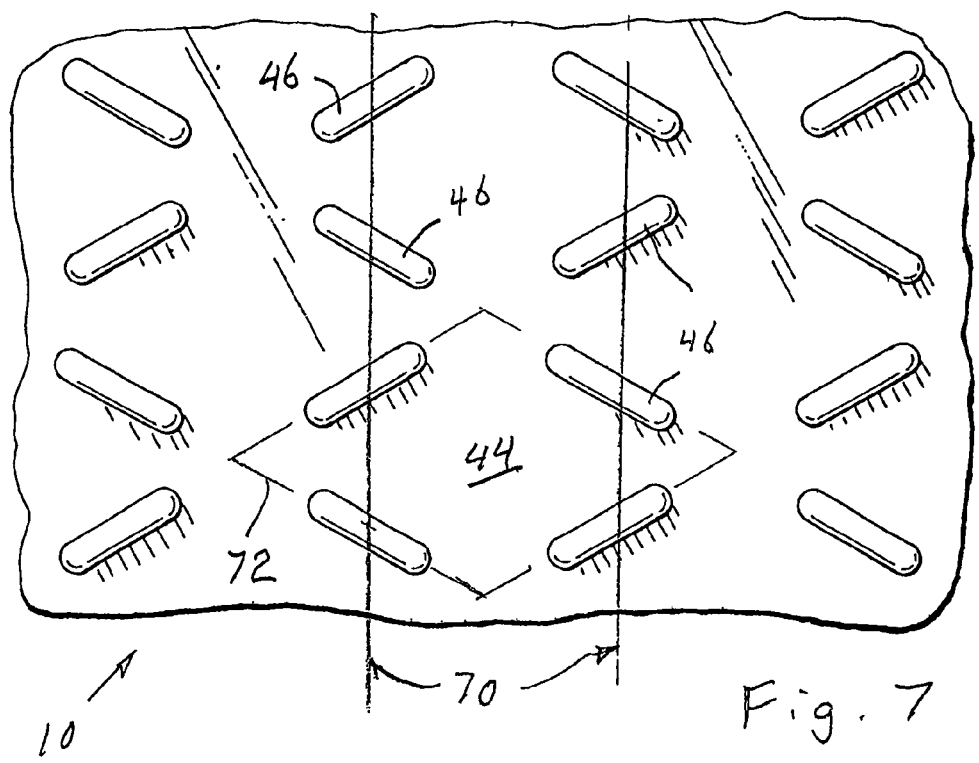
FIG. 7 is a bottom plan view of a portion of another desk chair mat of the present invention.

The arrays of the projections 46 need not be rectangular. For example, in FIGS. 6 and 7, the bottom surfaces 44 of mats 10 with two different arrays wherein the projections 46 are arranged in a non-perpendicular manner with respect to each other. In FIG. 6 the projections 46 are arranged in rows 68 of parallel projections 46. The projections in adjacent rows 68 are arranged at angle of about 60° with respect to each other and aligned so that the projections 46 in adjacent pairs of rows appear as a series of chevrons that are missing a middle portion. In FIG. 7, the projections 46 in each row 70 alternate orientation by an angle of about 60° so that the overall pattern defines a series of diamonds 72 outlined by the projections 46, the corners of the diamonds being located midway between the rows 70 of projections 46. The non-rectangular arrays of projections shown in FIGS. 6 and 7 still provide the desired lateral stability to the mat 10 when placed on a carpet 48.

Figure 8:
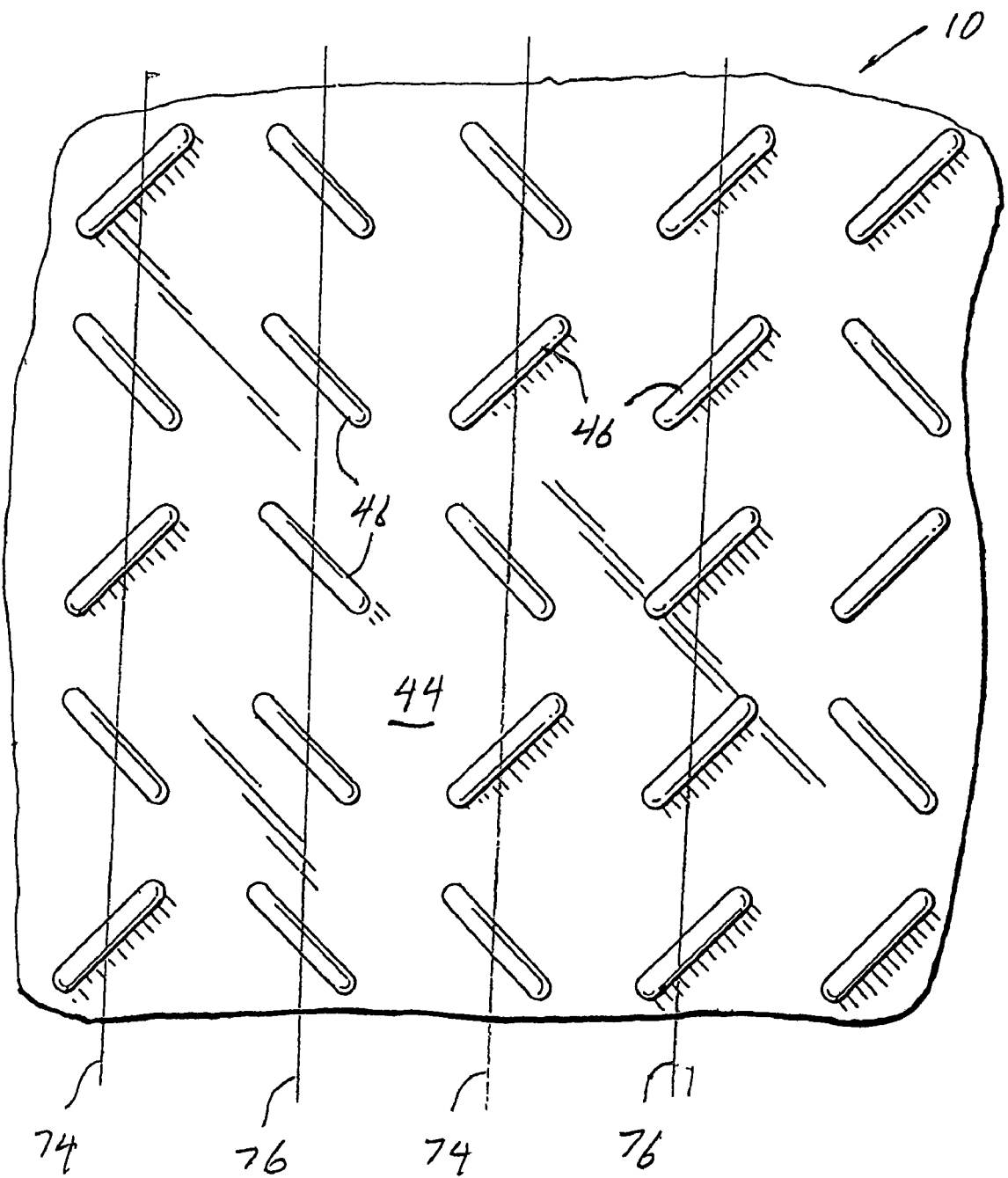
FIG. 8 is a bottom plan view of a portion of another desk chair mat of the present invention.

FIG. 8 shows yet another arrangement of the projections 46 on the bottom surface 44 of a mat 10 of the present invention that involves alternating rows 74 and 76. The projections 46 in rows 74 are placed in an alternating angular pattern with the angle between adjacent projections 46 being about 90°. The projections 46 in rows 76 are all parallel with each other, and arranged parallel to one of the two sets of projections 46 in row 74. Examined diagonally, it will be seen that the projections 46 are arranged in pairs with a first two projections being situated in a first orientation and the next two projections being situated at 90° to the first orientation.

FIGS. 9 and 10 show the bottom surfaces 44 of mats 10 with two different arrangements of the projections 46, wherein each of the projections 46 is an arcuate element having an outside surface 78 and an inside surface 80 joined by rounded tip surfaces 60. In FIG. 9 the projections 46 arranged in rectangular sets 82 of four projections in each set. The sets 82 are then situated in a rectangular array. In FIG. 10, the arcuate projections 46 are arranged in diagonal rows 84 with the arcuate projections in each row alternating in orientation by 180°.

Figure 11:
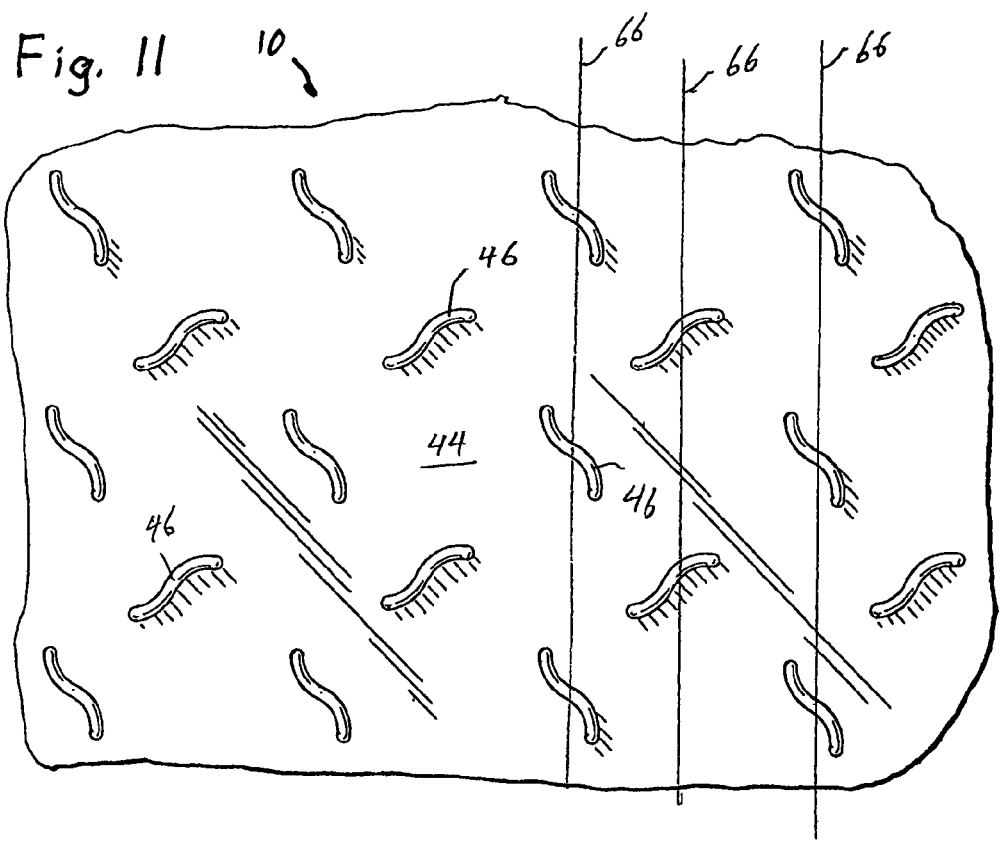
FIG. 11 is another bottom plan view of a portion of another desk chair mat of the present invention.

FIG. 11 shows the bottom surfaces 44 of mat 10 having an arrangement of blunt projections 46, wherein each of the projections is a doubly curved element in the form of an S. The arrangement of the projections 46 shown in FIG. 11 is similar to the arrangement shown in FIG. 5, but the rows 66 are perpendicular rather than diagonal. Mats 10 having the non-linear projections 46 shown in FIGS. 9–11 may be less apparent to the casual observer when situated on a carpet having a complex pattern than mats with the more linear elements shown in FIGS. 5–8, and may thus contribute to a given office appearance. Alternatively, arrays of parallel linear projections that are suitably spaced from each other can also contribute to a very official appearance while achieving the desired stability of the chair mat.

Figure 13:
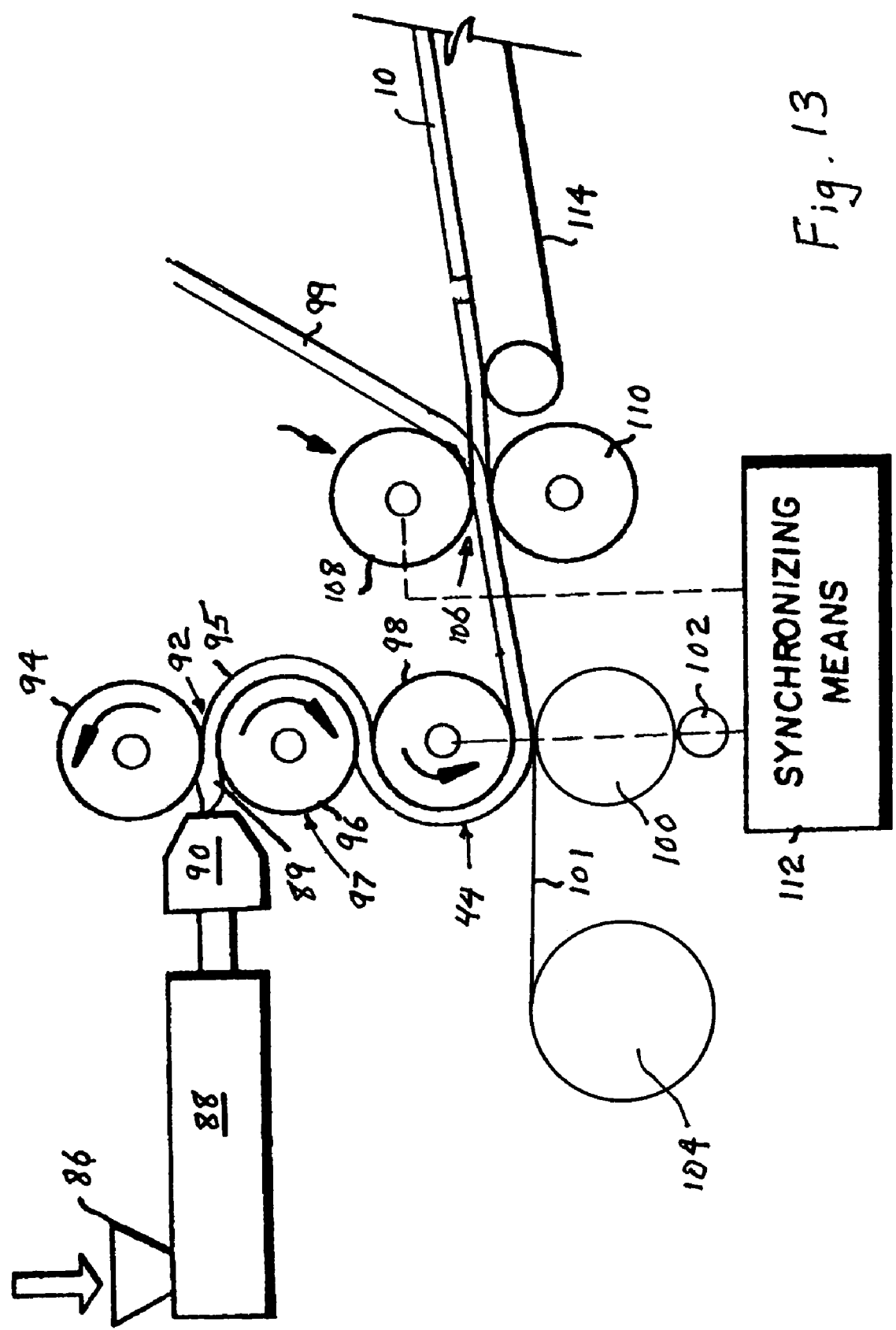
FIG. 13 is a schematic illustration of a method for making a desk chair mat of the present invention.

One convenient method for manufacturing the mats 10 is illustrated schematically in FIG. 13. A suitable polymer is introduced into inlet 86 of extruder 88 typically in pellet form. The extruder 88 heats and works the polymer in a well know fashion to form a continuous stream 89 of plastic that exits outlet 90. The outlet 90 is situated adjacent to a nip region 92 between two generally cylindrical rollers 94 and 96. The position of the upper roller 94 with respect to the main roller 96 can be controlled to define the width of the nip region 92 which also controls the thickness T of the web 95 and the mats 10 formed by the process. In accordance with the present invention, the main roller 96 includes a surface 97 formed, for example, by machining, etching, engraving or carving to include indentations for defining the projections 46. The surface 97 can also include indentations or projections reflecting the graphic image 49 that is desired to be created on the lower surface 44 of the chair mat 10. A take-off roller 98 is positioned below the main roller 96 to ensure that the extruded plastic web 95 is retained in contact with the surface 97 of the main roller 96 for sufficient time to "freeze" the features of the projections 46, and optionally the graphic image 49, into the plastic of the chair mat 10. The take-off roller 98 can be used in conjunction with an application roller 100 and an ink roller 102 to apply a printed graphic image 49 to the bottom surface 44 of the web 95. The take-off roller 98 can also be used in conjunction with application roller 100 to apply a label or decal 101 from a supply roller 104 to the bottom surface 44 of the web 95. The take-off roller 98 can also direct the extruded plastic web 95 through a nip 106 between cutting rollers 108 and 110 that can be used to separate the chair mats 10 from each other and from any waste portion 99 of the web 95. The position of the cutting rollers 108 and 110 with respect to the various areas 45 and 47 containing, respectively, the projections 46 and graphic images 49 can be controlled by a synchronizing means 112 such as a timing belt or an optical sensor and control. The desk pads 10 can then be conveyed by conveyor 114 for additional processing and packaging, if desired.

The foregoing detailed description should be regarded as illustrative rather than limiting, and the following claims, including all equivalents, define the spirit and scope of this invention.

What is claimed is:

1. A desk chair mat for interposition between a carpet and a chair, the desk chair mat comprising: a substantially transparent body having a generally planar upper surface suitable for interaction with a chair support structure, a perimeter defining an outer edge of the body, and a lower surface generally parallel to the upper surface, the lower surface including a first area having an array of projections, at least some of the projections being in the form of closed loops, the projections having blunt end surfaces extending downwardly for engagement with any underlying carpet, and a second area having a graphical image visible through the upper surface.

2. The desk chair mat of claim 1 wherein the end surface of each of the projections is smooth.

3. The desk chair mat of claim 2 wherein the smooth end surface of each of the blunt projections is generally parallel to the lower surface.

4. The desk chair mat of claim 2 wherein a horizontal cross-sectional aspect ratio of each of the blunt projections is between about 2 and 4.

5. The desk chair mat of claim 2 wherein the smooth end surface of each of the blunt projections has an area of at least about 8 mm$^2$.

6. The desk chair mat of claim 2 wherein the smooth end surface of each of the blunt projections is spaced from the lower surface by about 3 to 10 mm.

7. The desk chair mat of claim 1 wherein the projections are arrayed such that each projection is spaced from its nearest neighbor projection by between about 1 and 4 cm.

8. The desk chair mat of claim 2 wherein a vertical cross-sectional aspect ratio of the blunt projections is greater than one in a first direction and less than one in a second direction.

9. The desk chair mat of claim 1 wherein the array comprises a regular pattern of blunt projections arranged at an angle with respect to each nearest neighbor.

10. The desk chair mat of claim 9 wherein the angle is at least 30°.

11. The desk chair mat of claim 1 wherein the second area is devoid of any of the projections.

12. A desk chair mat for interposition between a carpet and a chair, the desk chair mat comprising: a semi-rigid sheet of plastic having a substantially planar upper surface suitable for interaction with a chair support structure, a perimeter defining an outer edge of the mat, a lower surface parallel to the upper surface, a first area of the lower surface containing an array of blunt projections extending downwardly from the lower surface for engagement with any underlying carpet, each projection having a smooth end surface spaced below the lower surface by a distance sufficient to penetrate into the carpet, the array being a regular pattern of the blunt projections arranged at an angle with respect to each nearest neighbor to provide resistance to any lateral movement of the mat with respect to the carpet, at least some of the projections being in the form of closed loops, and a second area of the lower surface devoid of the blunt projections containing a graphic image visible through the upper surface.

13. A desk chair mat for interposition between a carpet and a chair, the desk chair mat comprising: a substantially transparent body having a generally planar upper surface suitable for interaction with a chair support structure, a perimeter defining an outer edge of the body, and a lower surface generally parallel to the upper surface, the lower surface including a first area having an array of projections in the form of closed loops having blunt end surfaces extending downwardly for engagement with any underlying carpet, and a second area having a graphical image visible through the upper surface.

14. The desk chair mat of claim 13 wherein the blunt end surface of each of the closed loops is generally parallel to the lower surface.

15. The desk chair mat of claim 14 wherein the blunt end surface of each of the closed loops is spaced from the lower surface by about 3 to 10 mm.

16. The desk chair mat of claim 1, 12, or 13 wherein at least some of the closed loops are nested within others of the closed loops.

17. The desk chair mat of claim 1, 12, or 13 wherein at least some of the closed loops are in the form of squares.

* * * * *